United States Patent
Wang et al.

(10) Patent No.: US 11,589,026 B2
(45) Date of Patent: Feb. 21, 2023

(54) METHOD FOR GENERATING AND DISPLAYING PANORAMA IMAGES BASED ON RENDERING ENGINE AND A DISPLAY APPARATUS

(71) Applicants: BEIJING BOE OPTOELECTRONICS TECHNOLOGY CO., LTD., Beijing (CN); BOE Technology Group Co., Ltd., Beijing (CN)

(72) Inventors: Xuefeng Wang, Beijing (CN); Yukun Sun, Beijing (CN); Jinghua Miao, Beijing (CN); Hao Zhang, Beijing (CN); Lili Chen, Beijing (CN); Xi Li, Beijing (CN); Bin Zhao, Beijing (CN); Jianwen Suo, Beijing (CN); Jinbao Peng, Beijing (CN); Wenyu Li, Beijing (CN); Qingwen Fan, Beijing (CN); Zhifu Li, Beijing (CN); Yuanjie Lu, Beijing (CN)

(73) Assignees: BEIJING BOE OPTOELECTRONICS TECHNOLOGY CO., LTD., Beijing (CN); BOE Technology GroupCo., Ltd., Beijing (CN)

( * ) Notice: Subject to any disclaimer, the term of this patent is extended or adjusted under 35 U.S.C. 154(b) by 558 days.

(21) Appl. No.: 16/626,486

(22) PCT Filed: Nov. 21, 2018

(86) PCT No.: PCT/CN2018/116738
§ 371 (c)(1),
(2) Date: Dec. 24, 2019

(87) PCT Pub. No.: WO2020/103040
PCT Pub. Date: May 28, 2020

(65) Prior Publication Data
US 2021/0409669 A1    Dec. 30, 2021

(51) Int. Cl.
*H04N 7/18* (2006.01)
*H04N 13/117* (2018.01)
(Continued)

(52) U.S. Cl.
CPC ....... *H04N 13/117* (2018.05); *H04N 5/23238* (2013.01); *H04N 13/243* (2018.05); *H04N 13/332* (2018.05)

(58) Field of Classification Search
CPC .................................................. H04N 13/117
(Continued)

(56) References Cited

U.S. PATENT DOCUMENTS 8,542,289 B1 * 9/2013 McClatchie ........... H04N 5/247
348/222.1
9,369,689 B1 * 6/2016 Tran ...................... H04N 13/239
(Continued)

FOREIGN PATENT DOCUMENTS

| CN | 1437165 A | 8/2003 |
| CN | 101000460 A | 7/2007 |

(Continued)

OTHER PUBLICATIONS

International Search Report & Written Opinion dated Aug. 20, 2019, regarding PCT/CN2018/116738.
(Continued)

*Primary Examiner* — Leron Beck
(74) *Attorney, Agent, or Firm* — Intellectual Valley Law, P.C.

(57) ABSTRACT

The present application discloses method for generating a panorama image based on a rendering engine associated with a display apparatus. The method includes determining a display model configured to be a polygon prism for a rendering engine corresponding to a panorama view of a scene. Additionally, the method includes using multiple
(Continued)

sampling cameras associated with the rendering engine to capture multiple sample sub-images of the panorama view in respective directions towards multiple sub-planes of the polygon prism. The method further includes attaching the multiple sample sub-images to respective multiple sub-planes to form a constructed display model. Furthermore, the method includes rendering the constructed display model by the rendering engine to reconstruct a panorama image and displaying the panorama image on the display apparatus.

19 Claims, 6 Drawing Sheets

(51) Int. Cl.
*H04N 13/332* (2018.01)
*H04N 13/243* (2018.01)
*H04N 5/232* (2006.01)

(58) Field of Classification Search
USPC .......................................................... 348/38
See application file for complete search history.

(56) References Cited

U.S. PATENT DOCUMENTS

| | | | | |
|---|---|---|---|---|
| 2004/0233222 | A1* | 11/2004 | Lee | G06T 19/20 345/621 |
| 2007/0172133 | A1* | 7/2007 | Kim | H04N 19/70 375/E7.199 |
| 2007/0206945 | A1* | 9/2007 | DeLorme | H04N 5/23238 396/332 |
| 2013/0321413 | A1* | 12/2013 | Sweeney | H04N 7/142 345/420 |
| 2013/0322845 | A1* | 12/2013 | Suzuki | G06F 3/04815 386/230 |
| 2014/0085412 | A1* | 3/2014 | Hayashi | G06T 11/60 348/37 |
| 2014/0098095 | A1* | 4/2014 | Lee | G06F 3/041 345/420 |
| 2014/0132706 | A1* | 5/2014 | Kira | H04N 13/243 348/36 |
| 2016/0071314 | A1 | 3/2016 | Nordstoga et al. | |
| 2018/0122042 | A1* | 5/2018 | Kim | G06F 3/0346 |
| 2018/0262684 | A1* | 9/2018 | Lowry | G01S 3/7865 |
| 2018/0302572 | A1* | 10/2018 | Barnes | H04N 13/243 |
| 2019/0222824 | A1* | 7/2019 | Sheridan | H04N 13/344 |

FOREIGN PATENT DOCUMENTS

| | | |
|---|---|---|
| CN | 101000461 A | 7/2007 |
| CN | 201788354 U | 4/2011 |
| CN | 105404441 A | 3/2016 |
| CN | 205067961 U | 3/2016 |
| CN | 105488775 A | 4/2016 |
| CN | 105930535 A | 9/2016 |
| CN | 106101577 A | 11/2016 |
| CN | 107358577 A | 11/2017 |
| CN | 108333905 A | 7/2018 |
| KR | 101619486 B1 | 5/2016 |

OTHER PUBLICATIONS

First Office Action in the Chinese Patent Application No. 201880002121.6, dated Apr. 17, 2020; English translation attached.

Su, Li, "Cubic Panorama of Self-calibration and Navigation Algorithms", Chinese Master Thesis Full-text Database Information Science and Technology, Jan. 15, 2011, No. 01 ISSN:1674-0246, pp. 9, 14-15,33,36.

* cited by examiner

METHOD FOR GENERATING AND DISPLAYING PANORAMA IMAGES BASED ON RENDERING ENGINE AND A DISPLAY APPARATUS

CROSS-REFERENCE TO RELATED APPLICATION

This application is a national stage application under 35 U.S.C. § 371 of International Application No. PCT/CN2018/116738, filed Nov. 21, 2018, the contents of which are incorporated by reference in the entirety.

TECHNICAL FIELD

The present invention relates to display technology, more particularly, to a method for generating panorama images based on rendering engine, and a display apparatus implementing the method.

BACKGROUND

In some applications, mobile virtual reality (VR) apparatus needs to display a panorama image instead of rendering real scene in real-time to smoothly play the VR video. A conventional panorama image includes a single 360° image generated from a texture model in a sphere shape. Several issues existed with this sphere model include 1) display image distortion caused by the patch aggregation of the single panorama image in vertical direction from a top point to a bottom point of the sphere model; 2) limitation of maximum image resolution of an image in a certain field-of-view angle due to lack of decoding ability in image's pixel resolution of the single panorama image under the same field-of-view angle.

SUMMARY

In an aspect, the present disclosure provides a method for generating a panorama image based on a rendering engine associated with a display apparatus. The method includes determining a display model configured to be a polygon prism for the rendering engine corresponding to a panorama view of a scene. The method further includes using multiple sampling cameras associated with the rendering engine to capture multiple sample sub-images of the panorama view in respective directions towards multiple sub-planes of the polygon prism. Additionally, the method includes attaching the multiple sample sub-images to respective multiple sub-planes to form a constructed display model. Furthermore, the method includes rendering the constructed display model by the rendering engine to reconstruct a panorama image. Moreover, the method includes displaying the panorama image on the display apparatus.

Optionally, the polygon prism is an equilateral N-side polygon prism. N is an integer no smaller than 3.

Optionally, the step of determining a display model includes determining the multiple sub-planes divided respectively from each side or top or bottom plane of the equilateral N-side polygon prism.

Optionally, the step of determining a display model further includes determining different image resolutions corresponding to respective multiple sub-planes of different planes of the equilateral N-side polygon prism and determining a width and a length as well as a width-to-length ratio of each of the multiple sub-planes based on a ratio of $\tan(u/2)/\tan(v/2)$. u is a horizontal field-of-view angle and v is a vertical field-of-view angle projected from at least one of the multiple sampling cameras to each of the multiple sub-planes.

Optionally, the at least one of the multiple sampling cameras is located at a center of the display model.

Optionally, the step of using multiple sampling, cameras associated with the rendering engine to capture multiple sample sub-images includes separately sampling each of the multiple sample sub-images with an independently-defined image resolution depending on a scene in respective one direction toward one of multiple sub-planes projected from one of the multiple sampling cameras.

Optionally, the independently-defined image resolution for a single sub-plane is configured to be several times greater than a maximum image resolution allowed for a single field-of-view image in a conventional model.

Optionally, the step of using multiple sampling cameras associated with the rendering engine to capture multiple sample sub-images includes capturing at least two sample sub-images in projected squares respectively for top view toward a top plane and bottom view toward a bottom plane by slightly enlarging field-of-view angles to make the projected squares to be larger than the top plane or the bottom plane.

Optionally, the step of using multiple sampling cameras associated with the rendering engine to capture multiple sample sub-images includes using two sets of sampling cameras to capture two sets of sample sub-images with parallax for the multiple sub-planes and reconstructing a 3D panorama image based on the two sets of sample sub-images with parallax.

Optionally, the step of attaching the multiple sample sub-images to respective multiple sub-planes includes performing UV mapping to add image textures of each sample sub-image to a corresponding sub-plane and generating a constructed display model for the rendering engine.

Optionally, the step of using multiple sampling cameras associated with the rendering engine to capture multiple sample sub-images further includes sampling a series of sample sub-images time-sequentially with a sampling frequency for each of the multiple sub-planes of the display model; encoding all sample sub-images of a same sub-plane according to an order of being sampled to generate a sample sub-video; and attaching the sample sub-video to a corresponding sub-plane to form the constructed display model.

Optionally, the step of rendering the constructed display model includes rendering multiple sample sub-images respectively for the multiple sub-planes that are sampled at a same time to generate one panorama image at the same time and further generating a panorama video by encoding a series of panorama images sequentially in time.

Optionally, the step of displaying the panorama image comprises displaying the panorama video on the display apparatus by at least displaying a sub-video separately for respective one sub-plane in a direction of a field-of-view.

In another aspect, the present disclosure provides an apparatus for generating a panorama image based on a rendering engine associated with a display apparatus. The apparatus includes a memory and one or more processors. The memory and the one or more processors are connected with each other. The memory stores computer-executable instructions for controlling the one or more processors to determine a display model configured to be a polygon prism for the rendering engine corresponding to a panorama view of a scene; to use multiple sampling cameras associated with the rendering engine to capture multiple sample sub-images of the panorama view in respective directions towards multiple sub-regions of the polygon prism; to attach the multiple sample sub-images to respective multiple sub-regions to form a constructed display model; to render the constructed display model by the rendering engine to reconstruct a panorama image; and to display the panorama image on the display apparatus.

Optionally, the one or more processors is controlled by a programmable instruction to create a display model configured as an equilateral polygon prism with each of side, top, and bottom planes being, divided, into one or more sub-planes. Each sub-plane is independently defined with an image resolution.

Optionally, the one or more processors includes a rendering engine having multiple sampling cameras configured to capture multiple sample sub-images of a scene in multiple projection directions from at least one of the multiple sampling cameras located inside the display model towards one of the respective multiple sub-regions.

Optionally, the one or more processors is controlled by a programmable instruction to attach each of the multiple sample sub-images as textures to respective one of the multiple sub-regions of the polygon prism to form a constructed display model for the rendering engine.

Optionally, the rendering engine is configured to render the multiple sample sub-images associated with the respective multiple sub-regions of the constructed display model to generate a panorama image.

Optionally, the rendering engine is configured to sequentially render multiple sets of the multiple sample sub-images associated with the respective multiple sub-regions of the constructed display model, each set of the multiple sample sub-images being sequentially captured by a respective one of the multiple sampling cameras with a sampling frequency and encoded in a timing order to generate respective multiple sample sub-videos associated with the multiple sub-regions, and to generate a panorama video.

In yet another aspect, the present disclosure provides a display apparatus including a display panel coupled to the apparatus described herein for generating a panorama image or panorama video and being configured to display a panorama image or panorama video as a virtual reality display.

In still another aspect, the present disclosure provides a computer-program product including a non-transitory tangible computer-readable medium having computer-readable instructions thereon. The computer-readable instructions is executable by a processor to cause the processor to perform determining a display model configured to be a polygon prism for a rendering engine corresponding to a panorama view of a scene; using multiple sampling cameras associated with the rendering engine to capture multiple sample sub-images of the panorama view in respective directions towards multiple sub-regions of the polygon prism; attaching the multiple sample sub-images to respective multiple sub-regions to form a constructed display model; and rendering the constructed display model by the rendering engine to reconstruct a panorama image.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

For a VR display apparatus having built-in high image resolution, it is desirable that the content images to be displayed thereof are also provided in comparable high resolution. One source of the high-resolution content images is to sample multiple high-resolution images directly from real scenes by multiple sampling cameras based on a proper display model for a rendering engine associated with the display apparatus.

Accordingly, the present disclosure provides, inter alia, a method for generating a panorama image based on a rendering engine in a display apparatus, an apparatus for generating a panorama image, and a display apparatus having the same that substantially obviate one or more of the problems due to limitations and disadvantages of the related art.

Figure 1:
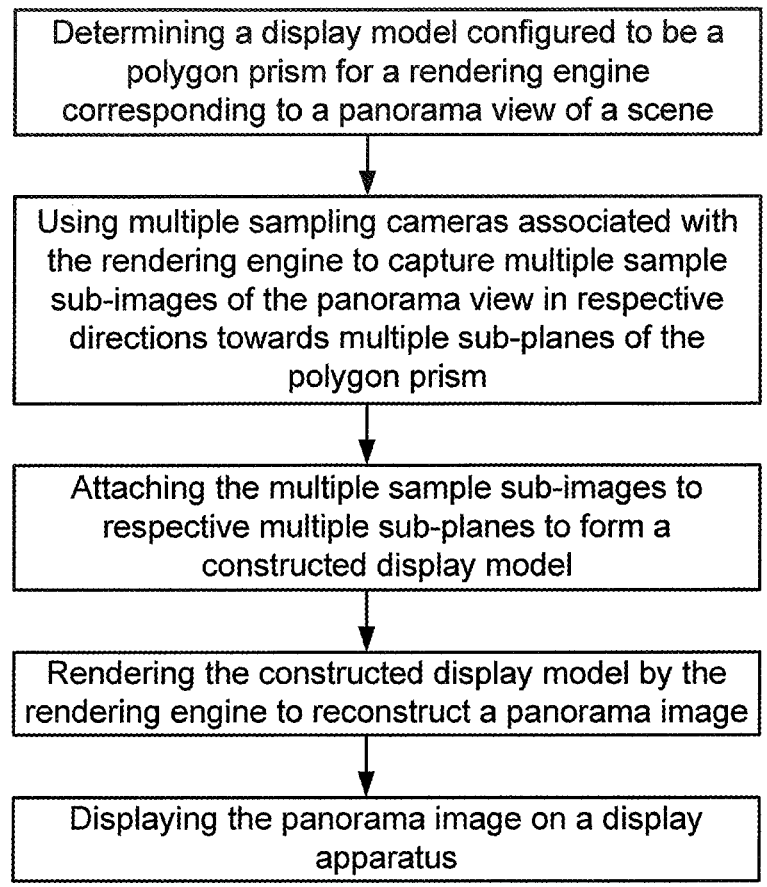
FIG. 1 is a flow chart showing a method for generating a panorama image based on a rendering engine according to some embodiments of the present disclosure.

In one aspect, the present disclosure provides a method for generating a panorama image based on a rendering engine in a display apparatus. FIG. 1 is a flow chart showing a method for generating a panorama image based on a rendering engine according to some embodiments of the present disclosure. Referring to FIG. 1, the method includes a step of determining a display model configured to be a polygon prism for a rendering engine corresponding to a panorama view of a scene. Optionally, the rendering engine is associated with a display apparatus. Optionally, the display apparatus is a virtual reality (VR) display apparatus capable of displaying images with high resolution such as 4K or 8K although it is not a limiting factor for the claims herein. Optionally, the rendering engine is a 3D rendering engine configured to treating image data for 3D image display. Optionally, the 3D rendering engine needs a 3D display model to be based upon.

Figure 2:
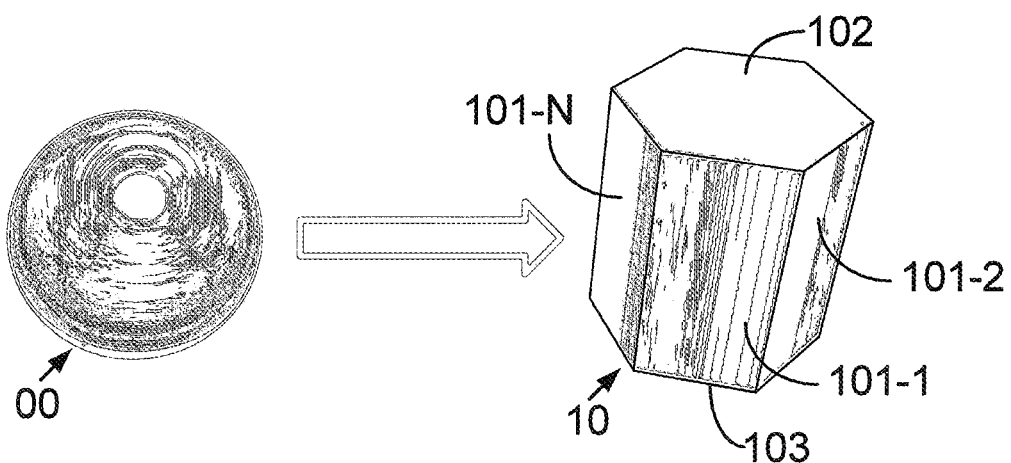
FIG. 2 is a schematic diagram comparing a conventional model and a display model for a rendering engine according to an embodiment of the present disclosure.

FIG. 2 a schematic diagram comparing a conventional model and a display model for a rendering engine according to an embodiment of the present disclosure. Conventionally, a sphere model 00 is used as a 3D display model for generating a single 360° panorama image. It is relatively complex to use the sphere model 00 to generate the panorama image especially for the top point and the bottom point of the image which often induces patch aggregation to cause display distortion. But for a viewer using a virtual reality display apparatus to watch the panorama image, it is more likely the user would focus on the objects located in horizontal view directions instead of the objects located in view directions of straight above or down, making information in the straight above portion or down portion of the image much less important. In this disclosure, a novel display model such as a polygon prism model 10 as shown in FIG. 2 is provided. Optionally, the polygon prism model 10 is an equilateral polygon prism with N rectangular side planes and two equilateral polygon planes respectively at top and bottom. For example, a first side plane is denoted as 101-1, a second side plane is denoted as 101-2, and a last one side plane is denoted as 101-N. A top plane is denoted as 102. A bottom plane is denoted as 103. When the polygon prism model is in use for the rendering engine to generate a panorama image, it is required to attach at least N+2 image maps to respective N+2 planes of the polygon prism model 10, compared with one single image map attached to the spherical surface of the conventional model 00. The display model according to the present disclosure obviates the need of performing spherical transformation to a 2D image data and the need of performing edge stitching of the image, substantially simplifying the image generation process.

Figure 3:
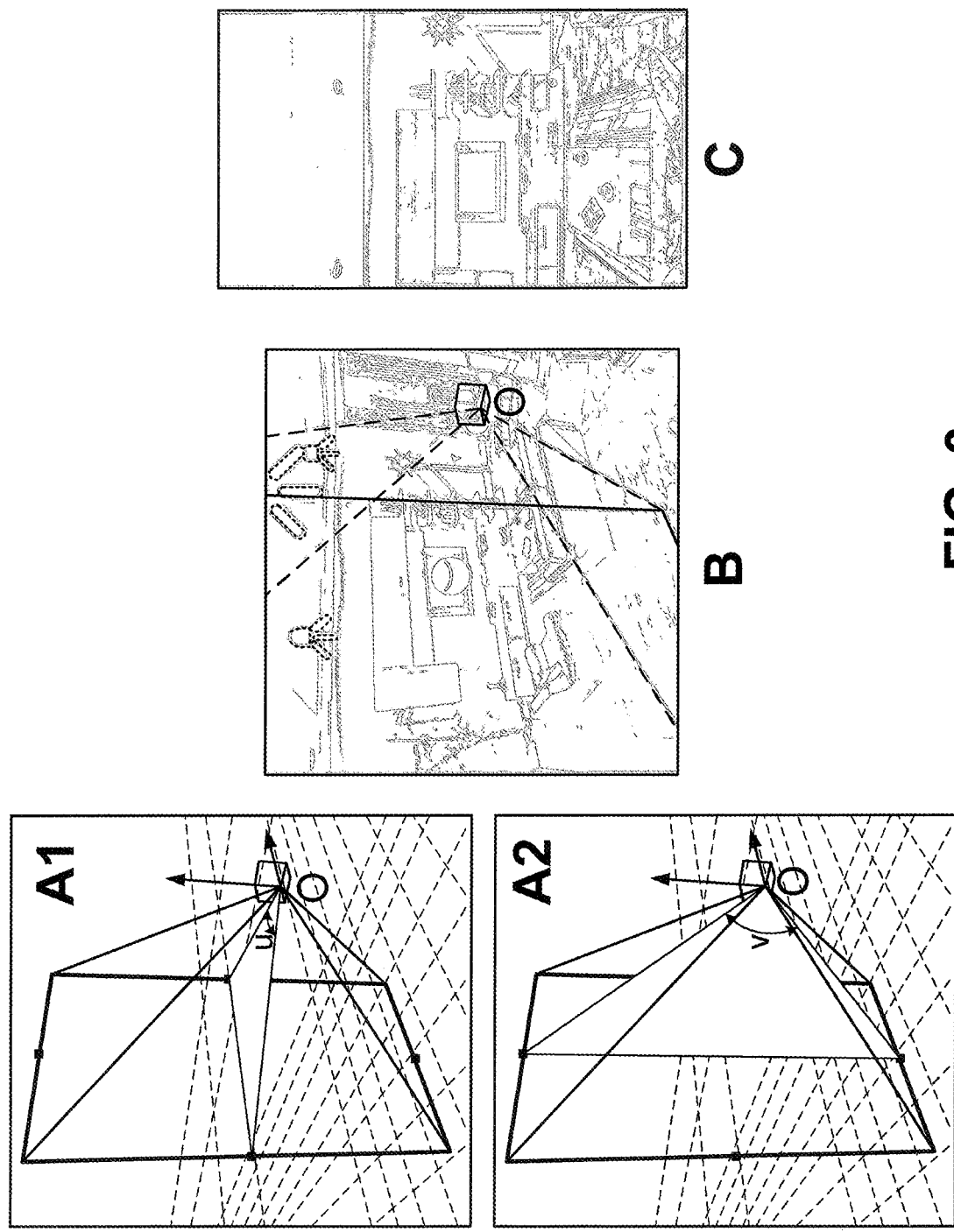
FIG. 3 is a schematic diagram showing a sample sub-image of a scene sampled by a sampling camera based on the display model according to an embodiment of the present disclosure.

Referring to FIG. 1 again, the method for generating a panorama image based on a rendering engine further includes using multiple sampling cameras associated with the rendering engine to capture multiple sample sub-images of the panorama view in respective directions towards multiple planes of the polygon prism. FIG. 3 is a schematic diagram showing a sample sub-image of a scene sampled by a sampling camera based on the display model according to an embodiment of the present disclosure. Referring to FIG. 3, part B refers to a sampling camera in the rendering engine being placed in a middle location of a scene and being configured to aim in a projection direction to sample an image of a certain width and length. Part A1 of FIG. 3 further schematically lays the sampling camera in terms of a rectangular lens matrix and a projection rectangle based on a field-of-view (FOV) angle. In particular, a horizontal FOV angle u is defined as an angle measured from the camera point O to a middle point of left boundary of the projection rectangle from the lens matrix and another middle point of right boundary of the projection rectangle from the lens matrix. The horizontal FOV angle u is effectively limited by N numbers of side planes of the polygon prism model. For example, N=6 for a hexagon prism, the FOV angle u is no bigger than 360°)/N=60° as each side plane is at most just the projection rectangle in corresponding FOV angle. Part A2 of FIG. 3 similarly shows a vertical FONT angle v defined as an angle measured from the camera point O to a middle point of top boundary of the lens matrix and another middle point of a bottom boundary of the lens matrix. This vertical FOV angle v is typically set to 90° in most VR display apparatus. Part C of FIG. 3 shows an exemplary sampled sub-image in the FOV angles (u, v) in a certain projection direction towards one side plane of the polygon prism model. After obtaining the horizontal and vertical FOV angles, a projection rectangle used for adding textures is given a relative size characterized by a width-to-height (w/h) ratio that satisfies the following relationship:

$$w/h = \tan(u/2)/\tan(v/2).$$

The actual size of the projection rectangle is substantially matched with the side plane if the FOV angle is the u and the sampling camera is located at the center in the hexagon prism model. Optionally, multiple sampling cameras are respectively employed to capture multiple sample sub-images of a panorama view in respective directions towards multiple planes of the polygon prism model. Each captured sample sub-image is saved in a memory associated with the rendering engine.

In a VR display apparatus, typically each single image generated by a rendering engine for a panorama image viewer has a limited maximum image resolution, e.g., 8192×4096. So a maximum resolution of a conventional displayable panorama image generated by the rendering engine is 8192×4096 under a width-to-height ratio of 2:1. Any panorama image with a resolution higher than that will be compressed down to 8192×4096. Additionally, any partial image of the panorama image corresponding to a specific FOV angle will be limited to an even smaller resolution. For example, if a viewer is in a middle of a model, a partial image within a horizontal FOV angle of 60° and a vertical FOV angle of 90° is limited to a resolution of (8192/6)×(4096/2)=1365×2048. In the polygon prism model 10, instead of a single image being mapped to the spherical surface, multiple sub-images are mapped respectively to multiple planes associated with the polygon prism model 10. Unlike the limitation of image resolution for the single panorama image, each single sub-image in the polygon prism model can have a resolution up to 8192×4096. Assuming the polygon prism is a hexagon prism, there are six side planes in a 360° view angle. Each sub-image attached to each side plane with maximum resolution of 8192×4096 can have a resolution of 24 times of the conventional partial image with maximum resolution of 1365×2048 within the same FOV angles. As each sub-image referred under the new polygon prism model is a displayable image, the image resolution displayed on the VR display apparatus is substantially increased by 3 times or more even when each sub-image resolution is lowered from the above-mentioned maximum resolution of 8192×4096 to 2865×4096. In an alternative embodiment, if a display model provided with the rendering engine includes additional sub-planes along a vertical direction, again each sub-image in those vertically divided sub-planes of the display model can be captured in high resolution which will contribute a final panorama image with a substantially enhanced image resolution.

Figure 4:
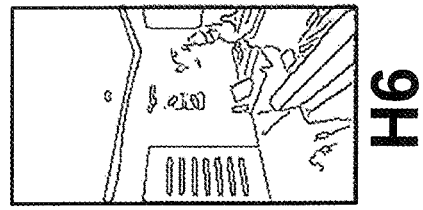
FIG. 4 is an exemplary diagram showing eight sample sub-images sampled from eight planes of a hexagon prism display model according to an embodiment of the present disclosure.
Figure 4:
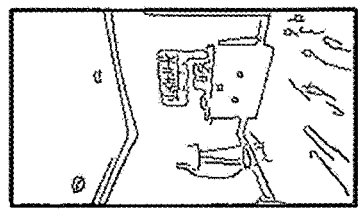
Figure 4:
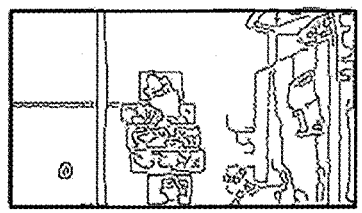
Figure 4:
Figure 4:
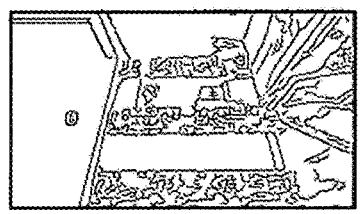
Figure 4:
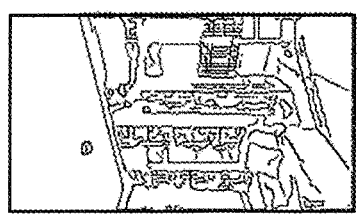
Figure 4:
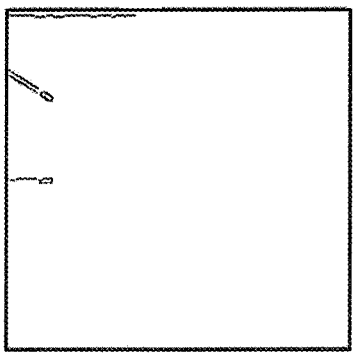
Figure 4:
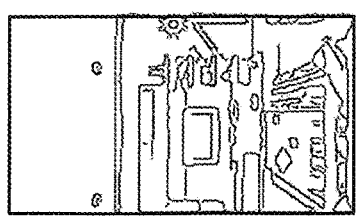

Referring to FIG. 1, the method additionally includes a step of attaching the multiple sample sub-images to respective multiple planes to form a constructed display model. Each sample sub-image captured from the scene by the sampling camera in the projection direction towards one of the multiple planes is attached to the corresponding side or top plane. Optionally, the captured sample sub-image contains a set of 2D image data. Optionally, attaching the set of 2D image data to the 3D polygon prism model is achieved by performing a LIV mapping scheme to attach the image to the corresponding plane of the 3D polygon prism model. Here, the UV mapping refers to a 3D modeling process of projecting a 2D image to a 3D model's surface for texture mapping. For a hexagon prism model, the multiple sample sub-images include six sample sub-images corresponding to six horizontal side planes and two sample sub-images corresponding to two end planes (one top plane and one bottom plane). FIG. 4 is an exemplary diagram showing eight sample sub-images sampled from either planes of a hexagon prism display model according to an embodiment of the present disclosure.

Referring to FIG. 4, in horizontal projections there are six 2D images H1~H6 mapped onto respective six side planes 101-1~101-6 of a hexagon prism model 10 (see. FIG. 2) and two 2D images U and D mapped onto respective a top plane 102 and a bottom plane 103 (see FIG. 2). Each 2D images sampled by respective sampling camera can be defined with a same resolution or independently defined with different resolutions depending on numbers of detailed textures in each individual 2D image. For example, in one projection direction, a scene has less number of objects with less variation in color, the sub-image in this projection direction can be sampled with a low resolution. In another example, in another projection direction, a scene contains more objects with multiple colors, the sub-image in this projection direction can be sampled with an enhanced resolution.

In some embodiments, the step of using multiple sampling cameras associated with the rendering engine to capture multiple sample sub-images includes capturing at least two sample sub-images in projected squares respectively for top view toward a top plane and bottom view toward a bottom plane by slightly enlarging field-of-view angles to make the projected squares to be larger than the top plane or the bottom plane. In a specific embodiment, each of the two 2D images U and D sampled respectively for the top and bottom planes are two square shaped, images sufficiently large (by enhancing the vertical FOV angle to cover the area of the two hexagons). Since a rendering pipeline of rendering engine can only take rectangular matrix of data to perform rendering of a 3D scene to a 2D screen, it is unable to capture other shaped images.

In an embodiment, as these 2D images are attached to respective planes of the 3D display model, e.g., the hexagon prism model, a constructed display model is formed for the rendering engine. Optionally, each sample sub-image of the eight 2D images is mapped to one corresponding plane of the 3D display panel through a UV mapping process. The UV mapping refers to a 3D modeling process of projecting a 2D image to a 3D model's surface for texture mapping. In particular, the 2D image substantially represents textures added to a corresponding surface region of the 3D model. The constructed display model becomes an executable data form that is subjected to treatment by the rendering engine.

Figure 5:
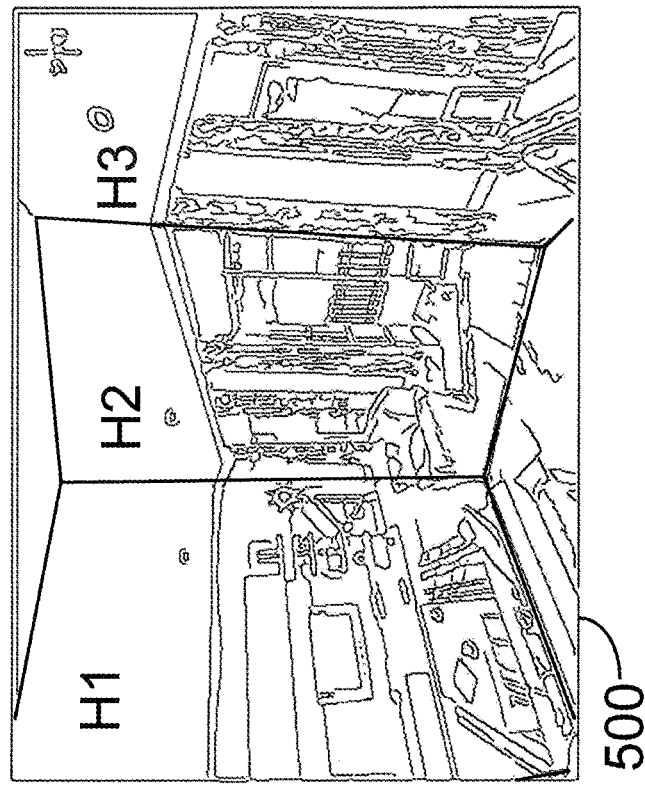
FIG. 5 is a schematic diagram of a virtual panorama image generated from a constructed display model by running a rendering engine according to an embodiment of the present disclosure.
Figure 5:
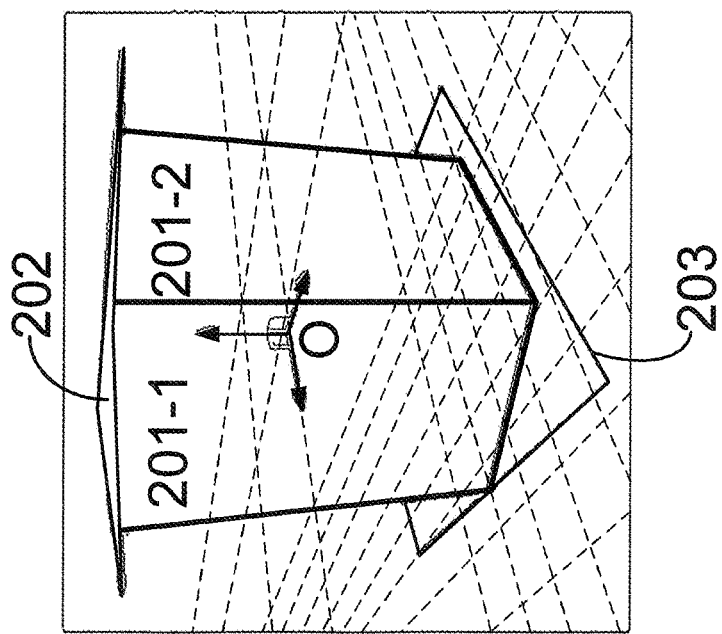

Referring to FIG. 1, the method for generating a panorama image based on a rendering engine includes a step of rendering the constructed display model by the rendering engine to reconstruct a panorama image. Optionally, rendering the constructed display model to use all individual sample sub-images collectively to construct a panorama image. FIG. 5 is a schematic diagram of a virtual panorama image generated from a constructed display model by running a rendering engine according to an embodiment of the present disclosure. On the left, a perspective view of the constructed display model is shown with two rectangular shaped side planes 201-1 and 201-2 (attached with corresponding sub-images though not shown) and a top plane 202 and a bottom plane 203 (with enlarged square shape). On the right, a portion of a virtual panorama image 500 is generated by the rendering engine with three sub-images H1, H2, and H3 being connected through the rendering process and partially indicated by the solid lines added therein for illustration purpose (which are otherwise not visible in the virtual panorama image 500.

In some embodiments, the step of using multiple sampling cameras associated with the rendering engine to capture multiple sample sub-images includes using two sets of sampling cameras to capture two sets of sample sub-images with parallax for the multiple sub-planes; and reconstructing a 3D panorama image based on the two sets of sample sub-images with parallax. For example, the eight 2D images in FIG. 4 can be one of two sets of eight 2D images separately captured by two sets of sampling cameras that are disposed based on results of a certain parallax calculation. Thus, the two sets of eight 2D images are two set of images correlated with the certain parallax and can be used to construct a virtual panorama image with 3D visual effect by the rendering engine.

In some embodiments, the step of using multiple sampling cameras associated with the rendering engine to capture multiple sample sub-images further includes sampling a series of sample sub-images time-sequentially with a sampling frequency for each of the multiple sub-planes of the display model; encoding all sample sub-images of a same sub-plane according to an order of being sampled to generate a sample sub-video; and attaching the sample sub-video to a corresponding sub-plane to form the constructed display model. For example, the eight 2D images in FIG. 4 can be one of a series of sets of eight 2D images captured by a set of sampling cameras sequentially in different time points with a fixed frequency such as 24 Hz or 30 Hz. In one example, 24 sets or 30 sets of eight 2D images are collected per second. Each 2D image is a sample sub-image corresponding to a field of view in the scene. Optionally, each group of the sample sub-images belonging to a same field of view can be encoded according to their timings of being captured. Optionally, these images can be encoded using video processing tools such as FFMPEG or OPENCV or similar software products to make one sub-video corresponding to the same field of view of the scene. Each sub-video can be displayed virtually on the display model in terms of running the rendering engine. As all sub-videos corresponding to respectively fields of views of the scene are displayed on the display model, a virtual panorama video can be generated by the rendering engine and displayed on the virtual reality display apparatus. Optionally, the high-resolution panorama video can be displayed in such a way to allow individual sub-video to be displayed on a lower resolution displayer (such as one based on Windows system) without installing a third-party decoder to handle the high-resolution video.

Figure 6:
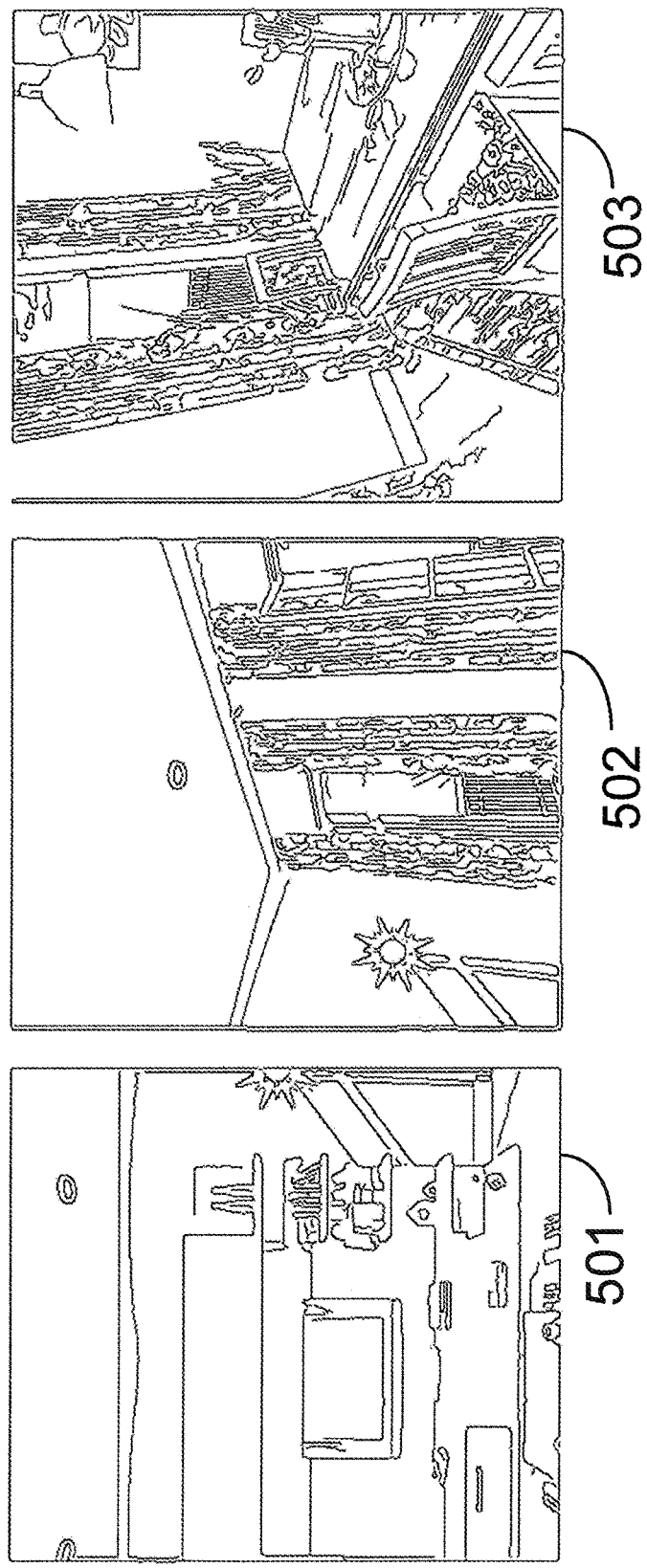
FIG. 6 is an exemplary diagram showing visual effects from several random field-of-view angles out of the virtual panorama image generated by the rendering engine according to some embodiments of the present disclosure.

FIG. 6 is an exemplary diagram showing partial visual effect images from several random field-of-view angles out of the virtual panorama image generated by the rendering engine according to some embodiments of the present disclosure. Referring to FIG. 6, each partial visual effect image, e.g., image 501, 502, or 503, represents a portion of the virtual panorama image generated according to the present method. Each of these visual effect images show no substantial image distortion and patch aggregation.

Figure 7:
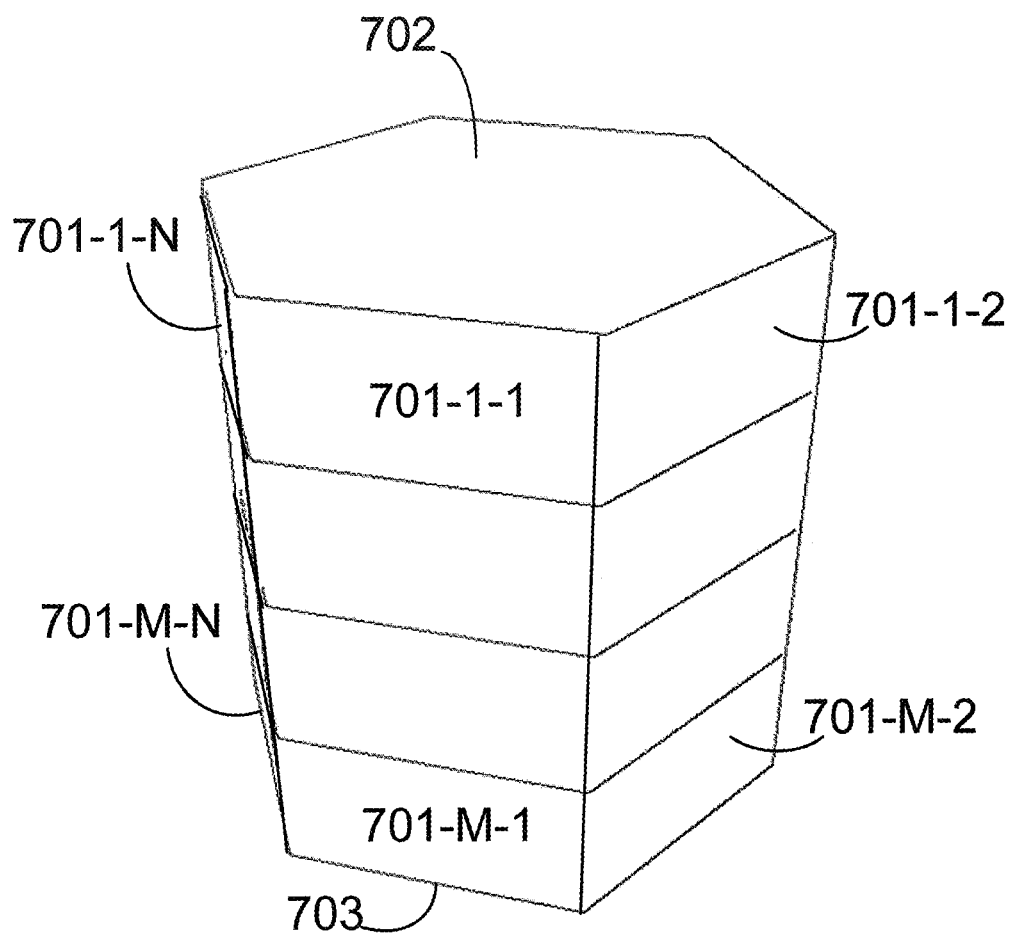
FIG. 7 is a schematic diagram of a display model for the rendering engine for generating a panorama image according to another embodiment of the present disclosure.

FIG. 7 is a schematic diagram of a display model for the rendering engine for generating a panorama image according to another embodiment of the present disclosure. In another embodiment, the display model is still a hexagon prism but with an upgraded sub-plane setup. In particular, the hexagon prism is divided equally into four layers along a central axis direction so that each side plane are divided into four sub-planes, leading to total 26 sub-planes that need to add textures by attaching corresponding sample sub-images onto thereof. As shown in FIG. 7, the first layer includes N side sub-planes: 701-1-1~701-1-N. The M-th layer also includes N side sub-planes: 701-M-1~701-M-N. In an example, M=4 and N=6. Additionally, as any polygon prism model there are two end sub-planes, one top plane 702 and one bottom plane 703. In a condition that considering pixel uniformity, each side sub-plane can be provided with a maximum image resolution of 8192×2928. With the horizontal FOV angle being 60° and vertical FOV angle being 90°, the number of pixels within such FOV angles can be reached up to 8192×11712. This results in a final panorama image having an image resolution 8 times higher than that based on the hexagon prism model 10 and 34 times higher than that based on conventional sphere model 00 shown in FIG. 2.

In another aspect, the present disclosure provides an apparatus for generating a panorama image based on a rendering engine associated with a display apparatus. Optionally, the display apparatus is a virtual reality (VR) display apparatus configured to display high resolution image with resolution of at least 4K or 8K. In an embodiment, the apparatus includes a memory and one or more processors. The memory and the one or more processors are connected with each other through a network connection. The network connection may be through a communication network, such as a wireless network, a wired network, and/or any combination of a wireless network and a wired network. The network may include a local area network, the Internet, a telecommunications network (Internet of Things), and/or any combination of the above-networks, etc. The wired network can communicate by means of twisted pair, coaxial cable or optical fiber transmission. A wireless communication network such as 3G/4G/5G mobile communication network, Bluetooth, Zigbee or Wi-Fi can be used. The memory stores computer-executable instructions for controlling the one or more processors. The memory may include static random-access memory (SRAM), electrically erasable programmable read-only memory (EEPROM), erasable programmable read-only memory (EPROM), read-only memory (ROM), magnetic memory, flash memory, disk, or optical disk. The memory stores computer-executable instructions for controlling the one or more processors to determine a display model configured to be a polygon prism for a rendering engine corresponding to a panorama view of a scene. Additionally, the memory stores computer-executable instructions for controlling the one or more processors to use multiple sampling cameras associated with the rendering engine to capture multiple sample sub-images of the panorama view in respective directions towards multiple sub-regions of the polygon prism. The memory stores computer-executable instructions for controlling the one or more processors further to attach the multiple sample sub-images to respective multiple sub-regions to form a constructed display model. Furthermore, the memory stores computer-executable instructions for controlling the one or more processors to render the constructed display model by the rendering engine to reconstruct a panorama image.

In an embodiment, the one or more processors includes a programmable instruction to create a display model configured as an equilateral polygon prism with each of side, top, and bottom planes being divided into one or more sub-planes. Optionally, each sub-plane is independently defined with an image resolution. Optionally, each sub-plane is self-defined with an image resolution.

In an embodiment, the one or more processors include a rendering engine having multiple sampling cameras configured to capture multiple sample sub-images of a scene in multiple projection directions from at least one of the multiple sampling cameras located inside the display model towards one of the respective multiple sub-planes.

In an embodiment, the one or more processors include a programmable instruction to attach each of the multiple sample sub-images as textures to respective one of the multiple sub-planes of the polygon prism to form a constructed display model for the rendering engine. The rendering engine is configured to render the multiple sample sub-images associated with the respective multiple sub-planes of the constructed display model to generate a panorama image. The rendering engine is further configured to sequentially render multiple sets of the multiple sample sub-images associated with the respective multiple sub-planes of the constructed display model. Each set of the multiple sample sub-images is sequentially captured by a respective one of the multiple sampling cameras with a frequency of, e.g., 24 Hz or 30 Hz, and encoded in a timing order to generate respective multiple sample sub-videos associated with the multiple sub-planes and generate a panorama video to be displayed on the display apparatus.

In yet another aspect, the present disclosure provides a display apparatus including a display panel coupled to the apparatus described herein for generating a panorama image or panorama video. The display apparatus is configured to display the panorama image or panorama video as a virtual reality display. Optionally, the display apparatus is a virtual reality (VR) display apparatus. Optionally, the display apparatus is built in lap top computer, desk top computer under Windows or Apple OP systems, smart phone under Android or Apple mobile OP systems, or any VR displayers.

In still another aspect, the present disclosure provides a computer-program product including a non-transitory tangible computer-readable medium having computer-readable instructions thereon. The computer-readable instructions are executable by a processor to cause the processor to perform determining a display model configured to be a polygon prism for a rendering engine corresponding to a panorama view of a scene. Additionally, the computer-readable instructions are executable by a processor to cause the processor to perform using multiple sampling cameras associated with the rendering engine to capture multiple sample sub-images of the panorama view in respective directions towards multiple sub-regions of the polygon prism. Furthermore, the computer-readable instructions are executable by a processor to cause the processor to perform attaching the multiple sample sub-images to respective multiple sub-regions to form a constructed display model. Moreover, the computer-readable instructions are executable by a processor to cause the processor to perform rendering the constructed display model by the rendering engine to reconstruct a panorama image. Optionally, the non-transitory tangible computer-readable medium is stored in a display apparatus containing a rendering engine. Optionally, the display apparatus is a virtual reality display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for generating a panorama image based on a rendering engine associated with a display apparatus comprising:
    determining a display model configured to be a polygon prism for the rendering engine corresponding to a panorama view of a scene;
    using multiple sampling cameras associated with the rendering engine to capture multiple sample sub-images of the panorama view in respective directions towards multiple sub-planes of the polygon prism;
    attaching the multiple sample sub-images to respective multiple sub-planes to form a constructed display model;
    rendering the constructed display model by the rendering engine to reconstruct a panorama image; and
    displaying the panorama image on the display apparatus;
    wherein the polygon prism is an equilateral N-side polygon prism; and
    determining the display model comprises determining different image resolutions corresponding to respective multiple sub-planes of different planes of the equilateral N-side polygon prism and determining a width and a length as well as a width-to-length ratio of each of the multiple sub-planes based on a ratio of tan(u/2)/tan(v/2), where u is a horizontal field-of-view angle and v is a vertical field-of-view angle projected from at least one of the multiple sampling cameras to each of the multiple sub-planes.

2. The method of claim 1, wherein N is an integer no smaller than 3.

3. The method of claim 2, wherein determining the display model further comprises determining the multiple sub-planes divided respectively from each side or top or bottom plane of the equilateral N-side polygon prism.

4. The method of claim 1, wherein the at least one of the multiple sampling cameras is located at a center of the display model.

5. The method of claim 1, wherein using multiple sampling cameras associated with the rendering engine to capture multiple sample sub-images comprises separately sampling each of the multiple sample sub-images with an independently-defined image resolution depending on a scene in respective one direction toward one of multiple sub-planes projected from one of the multiple sampling cameras.

6. The method of claim 5, wherein the independently-defined image resolution for a single sub-plane is configured to be several times greater than a maximum image resolution allowed for a single field-of-view image in a conventional model.

7. The method of claim 1, wherein using multiple sampling cameras associated with the rendering engine to capture multiple sample sub-images comprises capturing at least two sample sub-images in projected squares respectively for top view toward a top plane and bottom view toward a bottom plane by slightly enlarging field-of-view angles to make the projected squares to be larger than the top plane or the bottom plane.

8. The method of claim 1, wherein using multiple sampling cameras associated with the rendering engine to capture multiple sample sub-images comprises using two sets of sampling cameras to capture two sets of sample sub-images with parallax for the multiple sub-planes; and reconstructing a 3D panorama image based on the two sets of sample sub-images with parallax.

9. The method of claim 1, wherein attaching the multiple sample sub-images to respective multiple sub-planes comprises performing UV mapping to add image textures of each sample sub-image to a corresponding sub-plane and generating the constructed display model for the rendering engine.

10. The method of claim 1, wherein using multiple sampling cameras associated with the rendering engine to capture multiple sample sub-images further comprises sampling a series of sample sub-images time-sequentially with a sampling frequency for each of the multiple sub-planes of the display model; encoding all sample sub-images of a same sub-plane according to an order of being sampled to generate a sample sub-video; and attaching the sample sub-video to a corresponding sub-plane to form the constructed display model.

11. The method of claim 10, wherein rendering the constructed display model comprises rendering multiple sample sub-images respectively for the multiple sub-planes that are sampled at a same time to generate one panorama image at the same time and further generating a panorama video by encoding a series of panorama images sequentially in time.

12. A method for generating a panorama image based on a rendering engine associated with a display apparatus comprising:
    determining a display model configured to be a polygon prism for the rendering engine corresponding to a panorama view of a scene;
    using multiple sampling cameras associated with the rendering engine to capture multiple sample sub-images of the panorama view in respective directions towards multiple sub-planes of the polygon prism;
    attaching the multiple sample sub-images to respective multiple sub-planes to form a constructed display model;
    rendering the constructed display model by the rendering engine to reconstruct a panorama image; and
    displaying the panorama image on the display apparatus;
    wherein rendering the constructed display model comprises rendering multiple sample sub-images respectively for the multiple sub-planes that are sampled at a same time to generate one panorama image at the same time and further generating a panorama video by encoding a series of panorama images sequentially in time; and
    displaying the panorama image comprises displaying the panorama video on the display apparatus by at least displaying a sub-video separately for respective one sub-plane in a direction of a field-of-view.

13. An apparatus for generating a panorama image based on a rendering engine associated with a display apparatus, comprising:
a memory; and
one or more processors;
wherein the memory and the one or more processors are connected with each other; and
the memory stores computer-executable instructions for controlling the one or more processors to:
determine a display model configured to be a polygon prism for the rendering engine corresponding to a panorama view of a scene;
use multiple sampling cameras associated with the rendering engine to capture multiple sample sub-images of the panorama view in respective directions towards multiple sub-planes of the polygon prism;
attach the multiple sample sub-images to respective multiple sub-planes to form a constructed display model;
render the constructed display model by the rendering engine to reconstruct a panorama image; and
display the panorama image on the display apparatus;
wherein the polygon prism is an equilateral N-side polygon prism; and
the memory further stores computer-executable instructions for controlling the one or more processors to determine different image resolutions corresponding to respective multiple sub-planes of different planes of the equilateral N-side polygon prism and determining a width and a length as well as a width-to-length ratio of each of the multiple sub-planes based on a ratio of tan(u/2)/tan(v/2), where u is a horizontal field-of-view angle and v is a vertical field-of-view angle projected from at least one of the multiple sampling cameras to each of the multiple sub-planes.

14. The apparatus of claim 13, wherein the one or more processors is controlled by a programmable instruction to create a display model configured as an equilateral polygon prism with each of side, top, and bottom planes being divided into one or more sub-planes, each sub-plane being independently defined with an image resolution.

15. The apparatus of claim 14, wherein the one or more processors comprises a rendering engine having multiple sampling cameras configured to capture multiple sample sub-images of a scene in multiple projection directions from at least one of the multiple sampling cameras located inside the display model towards one of the respective multiple sub-planes.

16. The apparatus of claim 15, wherein the one or more processors is further controlled by a programmable instruction to attach each of the multiple sample sub-images as textures to respective one of the multiple sub-planes of the polygon prism to form a constructed display model for the rendering engine; wherein the rendering engine is configured to render the multiple sample sub-images associated with the respective multiple sub-planes of the constructed display model to generate a panorama image.

17. The apparatus of claim 16, wherein the rendering engine is configured to sequentially render multiple sets of the multiple sample sub-images associated with the respective multiple sub-planes of the constructed display model, each set of the multiple sample sub-images being sequentially captured by a respective one of the multiple sampling cameras with a sampling frequency and encoded in a timing order to generate respective multiple sample sub-videos associated with the multiple sub-planes, and to generate a panorama video.

18. A display apparatus comprises a display panel coupled to the apparatus according to claim 13 for generating a panorama image or panorama video and being configured to display a panorama image or panorama video as a virtual reality display.

19. A computer-program product comprising a non-transitory tangible computer-readable medium having computer-readable instructions thereon, the computer-readable instructions being executable by a processor to cause the processor to perform:
determining a display model configured to be a polygon prism for a rendering engine corresponding to a panorama view of a scene;
using multiple sampling cameras associated with the rendering engine to capture multiple sample sub-images of the panorama view in respective directions towards multiple sub-planes of the polygon prism;
attaching the multiple sample sub-images to respective multiple sub-planes to form a constructed display model; and
rendering the constructed display model by the rendering engine to reconstruct a panorama image;
wherein the polygon prism is an equilateral N-side polygon prism; and
the computer-readable instructions are further executable by a processor to cause the processor to perform determining different image resolutions corresponding to respective multiple sub-planes of different planes of the equilateral N-side polygon prism and determining a width and a length as well as a width-to-length ratio of each of the multiple sub-planes based on a ratio of tan(u/2)/tan(v/2), where u is a horizontal field-of-view angle and v is a vertical field-of-view angle projected from at least one of the multiple sampling cameras to each of the multiple sub-planes.

* * * * *